United States Patent
Wynne et al.

(10) Patent No.: US 11,592,053 B2
(45) Date of Patent: Feb. 28, 2023

(54) BLIND FASTENERS

(71) Applicant: Rooftop Anchor, Inc., Heber City, UT (US)

(72) Inventors: Kynan Wynne, Heber City, UT (US); Joshua P. Adam, Heber City, UT (US); Braxton T. Schindler, Heber City, UT (US)

(73) Assignee: Rooftop Anchor, Inc., Heber City, UT (US)

( * ) Notice: Subject to any disclaimer, the term of this patent is extended or adjusted under 35 U.S.C. 154(b) by 304 days.

(21) Appl. No.: 16/781,660

(22) Filed: Feb. 4, 2020

(65) Prior Publication Data
US 2021/0239150 A1 Aug. 5, 2021

(51) Int. Cl.
| | |
|---|---|
| F16B 13/08 | (2006.01) |
| F16B 37/08 | (2006.01) |
| F16B 37/14 | (2006.01) |
| F16B 37/00 | (2006.01) |

(52) U.S. Cl.
CPC ...... F16B 37/0864 (2013.01); F16B 13/0808 (2013.01); F16B 37/0857 (2013.01); F16B 37/145 (2013.01); F16B 2037/007 (2013.01)

(58) Field of Classification Search
CPC .................................................. F16B 13/0808
USPC ................................................. 411/340–345
See application file for complete search history.

(56) References Cited

U.S. PATENT DOCUMENTS

| | | | | |
|---|---|---|---|---|
| 1,374,926 A | * | 4/1921 | Karitzky | F16B 13/0808 411/342 |
| 2,565,391 A | * | 8/1951 | Molat | F16B 13/0808 411/342 |
| 2,761,349 A | * | 9/1956 | Heller | F16B 33/004 411/929 |
| 2,950,141 A | * | 8/1960 | Koff | F16B 13/0808 292/256.73 |
| 2,998,743 A | * | 9/1961 | Apfelzweig | F16B 13/0808 73/304 R |
| 3,168,850 A | * | 2/1965 | Tennican | F16B 13/0808 411/342 |
| 4,043,245 A | * | 8/1977 | Kaplan | F16B 13/0808 411/969 |
| 4,120,231 A | * | 10/1978 | Neumayer | F16B 13/0808 411/340 |
| 4,884,932 A | * | 12/1989 | Meyer | F16B 37/14 411/533 |
| 5,221,169 A | * | 6/1993 | McSherry | F16B 13/0808 411/344 |

(Continued)

OTHER PUBLICATIONS

3M, "3M(TM) DBI-SALA(R) Toggle Bolt 4-Pack 7241182, 1 EA," retrieved on Feb. 4, 2020 at <<https://www.3m.com/3M/en_US/company-us/all-3m-products/~/3M-DBISALA-Toggle-Bolt-4-Pack-7241182-1-EA/?N=5002385+3291096858&preselect=3293786499&rt=rud>> 2 pages.

*Primary Examiner* — Flemming Saether

(74) *Attorney, Agent, or Firm* — Renner, Otto, Boisselle & Sklar, LLP

(57) ABSTRACT

A blind fastener may include a bolt. The bolt includes a head, a shank coupled to the head, and a number of external threads formed on the shank. The blind fastener may also include a mount coupled to the bolt, and a fastening block coupled to the mount. The mount may include a body, at least one arm extending from the body, and at least one pivot mount formed on and extending from the arm about which the fastening block pivots.

20 Claims, 16 Drawing Sheets

(56) References Cited

U.S. PATENT DOCUMENTS

| | | | | |
|---|---|---|---|---|
| 6,226,952 | B1 * | 5/2001 | Romeu Guardia | E03F 5/06 |
| | | | | 411/85 |
| 6,913,430 | B2 * | 7/2005 | Ito | F16B 13/0808 |
| | | | | 411/340 |
| 7,736,108 | B1 * | 6/2010 | Bruce | F16B 13/0808 |
| | | | | 411/340 |
| 8,905,695 | B2 * | 12/2014 | Luke | F16B 13/0808 |
| | | | | 411/340 |
| 10,081,315 | B2 * | 9/2018 | Liu | B60R 13/105 |
| 2020/0173479 | A1 * | 6/2020 | Sunkara | F16B 13/0808 |

\* cited by examiner

BLIND FASTENERS

TECHNICAL FIELD

The present disclosure relates to fasteners, and, more specifically, to blind fasteners used to coupled elements together where one of the two ends of the fastener is inaccessible and/or obscured by another element.

BACKGROUND

A fastener is any device used to couple at least two elements together, and may come in a number of forms including, for example, bolts, screws, and rivets, among other fasteners. In one example, a bolt and mating nut may be used to couple at least two elements together. Blind fasteners may be used in a variety of situations where two or more elements are to be coupled to one another, but where one of the two ends of the fastener is inaccessible or obscured by another element. For example, a bolt may be extended through a deck, insulation, concrete and other materials that may be included on the roof of a building in order to couple elements that are installed on the roof to the roof. In this example, it may prove difficult to access the distal end of the bolt in order to attach the bolt thereto since the distal end of the bolt may be located at a place within the building that is too high to access or may be located behind interior structures within the building such as ceiling tiles, drywall, and other interior, ceiling finishing materials. Thus, a bolt and nut may not function as a blind fastener since the bolt may be extended through the roofing materials, but the distal end of the bolt is inaccessible or obscured such that the nut cannot be coupled to the distal end of the bolt.

An example system for use in rooftop anchoring includes in 3M™ DBI-SALA® Toggle Bolt (3M Product Number 7241182, 3M ID 70007900577) found at, for example, https://www.3m.com/3M/en_US/company-us/all-3m-products/~/3M-DBI-SALA-Toggle-Bolt-4-Pack-7241182-1-EA/?N=5002385+3291096858&preselect=3293786499&rt=rud (hereinafter "the 3M product"). The 3M product includes a toggle at an end of a bolt and carrier system. However, the 3M product does not allow for the user to apply force from a distal end on both sides of the toggle. Further, the toggle bolt of the 3M product protrudes from an outer perimeter of the 3M product requiring a larger hole in the material into which the 3M product is to be inserted. Still further, the 3M product does not include an indicator to indicate an orientation of the toggle portion of the 3M product. Even still further, the 3M product is not variable in length such that a user may truncate the cylindrical portion of the 3M product.

Examples of the present disclosure are directed toward overcoming the deficiencies described above.

SUMMARY

In an example of the present disclosure, a blind fastener may include a bolt. The bolt may include a head, a shank coupled to the head, and a number of external threads formed on the shank. The blind fastener may also include a mount threadingly coupled to the bolt, and a fastening block coupled to the mount. The fastening block may include a body, at least one arm extending from the body, and at least one pivot mount formed on and extending from the arm about which the fastening block pivots.

In another example of the present disclosure, a system may include a bolt. The bolt may include a head, a shank coupled to the head, and a number of external threads formed on the shank. The system may also include a sleeve including a rigid cylinder positioned around the shank. The sleeve may include a notch defined in the rigid cylinder. The system may also include a mount threadingly coupled to the bolt, and a fastening block coupled to the mount. The mount may include a body, at least one arm extending from the body, and at least one pivot mount formed on and extending from the arm about which the fastening block pivots. The mount may include a protrusion formed on and extending from the mount. The protrusion has a shape that mates with the notch.

In yet another example of the present disclosure, a blind fastener may include a bolt. The bolt may include a head, a shank coupled to the head, and a number of external threads formed on the shank. The blind fastener may also include a sleeve including a rigid cylinder positioned around the shank. The sleeve may include a notch defined in the rigid cylinder. A mount may be threadingly coupled to the bolt. The blind fastener may also include a fastening block coupled to the mount. The mount may include a body, at least one arm extending from the body, and at least one pivot mount formed on and extending from the arm about which the fastening block pivots. A spring may be coupled between the mount and the fastening block. The spring may be biased to pivot the fastening block about the pivot mount from a first orientation to a second orientation relative to a longitudinal axis of the blind fastener.

DETAILED DESCRIPTION

The systems, devices, and methods described herein provide for a blind fastener that may be used to couple elements together in situations where a distal end of the blind fastener is inaccessible and/or obscured. The blind fastener may include a bolt including a head, a shank coupled to the head, and a number of external threads formed on the shank. The blind fastener may also include a sleeve including a rigid cylinder positioned around the shank. A mount may be threadingly coupled to the bolt. The blind fastener may also include a fastening block coupled to the mount. The mount may include a body, a first arm and a second extending from the body, and a first pivot mount and second pivot mount formed on and extending from each of the first arm and second arm about which the fastening block pivots. A spring may be coupled between the mount and the fastening block. The spring may be biased to pivot the fastening block about the pivot mounts from a first orientation to a second orientation relative to a longitudinal axis of the blind fastener. In this manner, the spring-loaded action of the mount, fastening block, and spring provide for the fastening block (acting as a nut) to be oriented in a first orientation parallel to the longitudinal axis of the blind fastener (i.e., the bolt) when inserted into a hole drilled into the roofing materials. Through the biasing forces of the spring, the fastening block may be oriented to a second orientation as the fastening block pivots about the pivot mounts. This system allows for the blind fastener to enter into the hole drilled through the roofing materials from a first side of the roof, while still providing the fastening block to engage a surface of a second side of the roof opposite the first side against which the fastening block of the blind fastener may engage. In this state, the bolt may be threadingly coupled to the fastening block to create a fastening between the bolt and fastening block.

Figure 1:
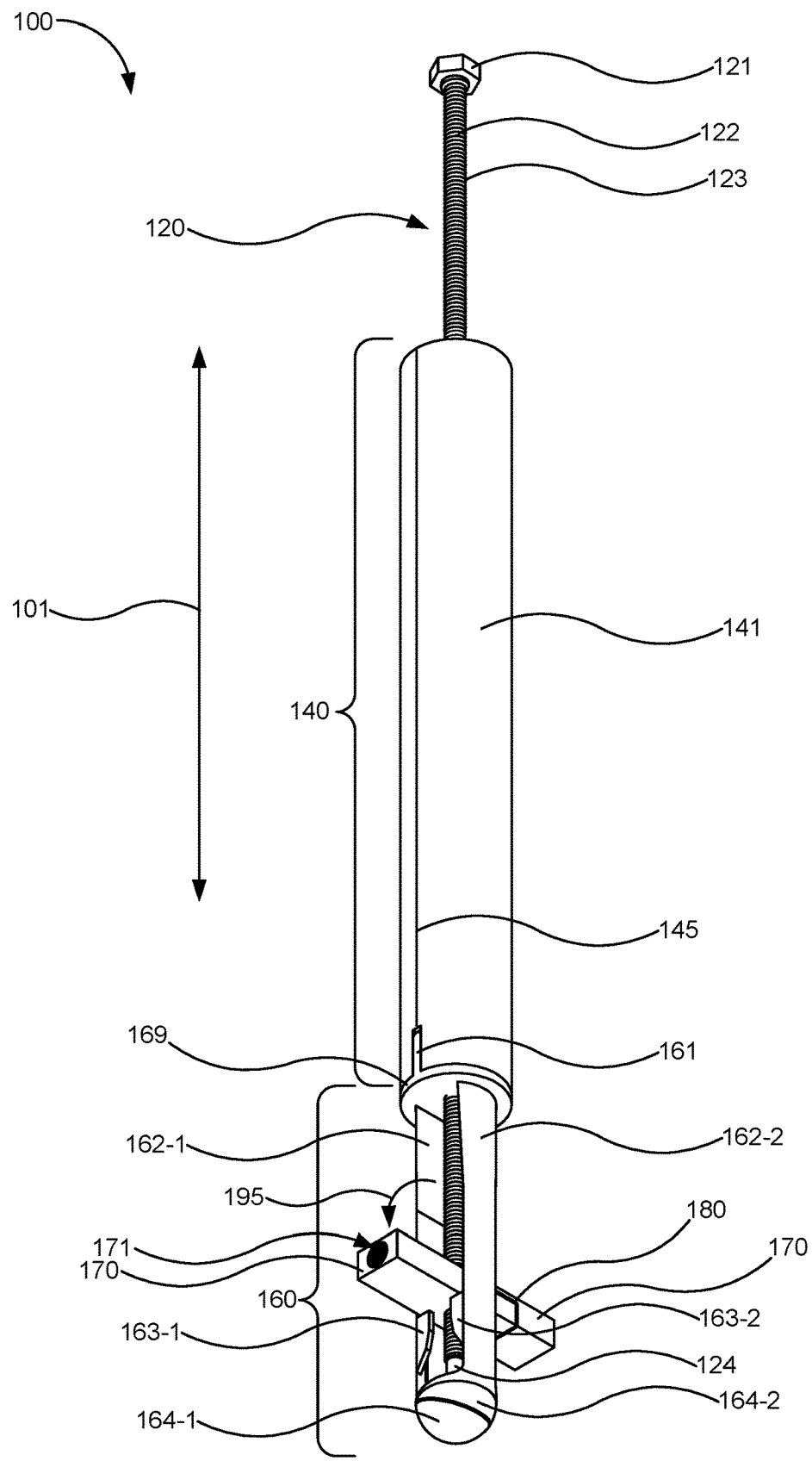
FIG. 1 is a perspective view of a blind fastener, according to an example of the principles described herein.
Figure 2:
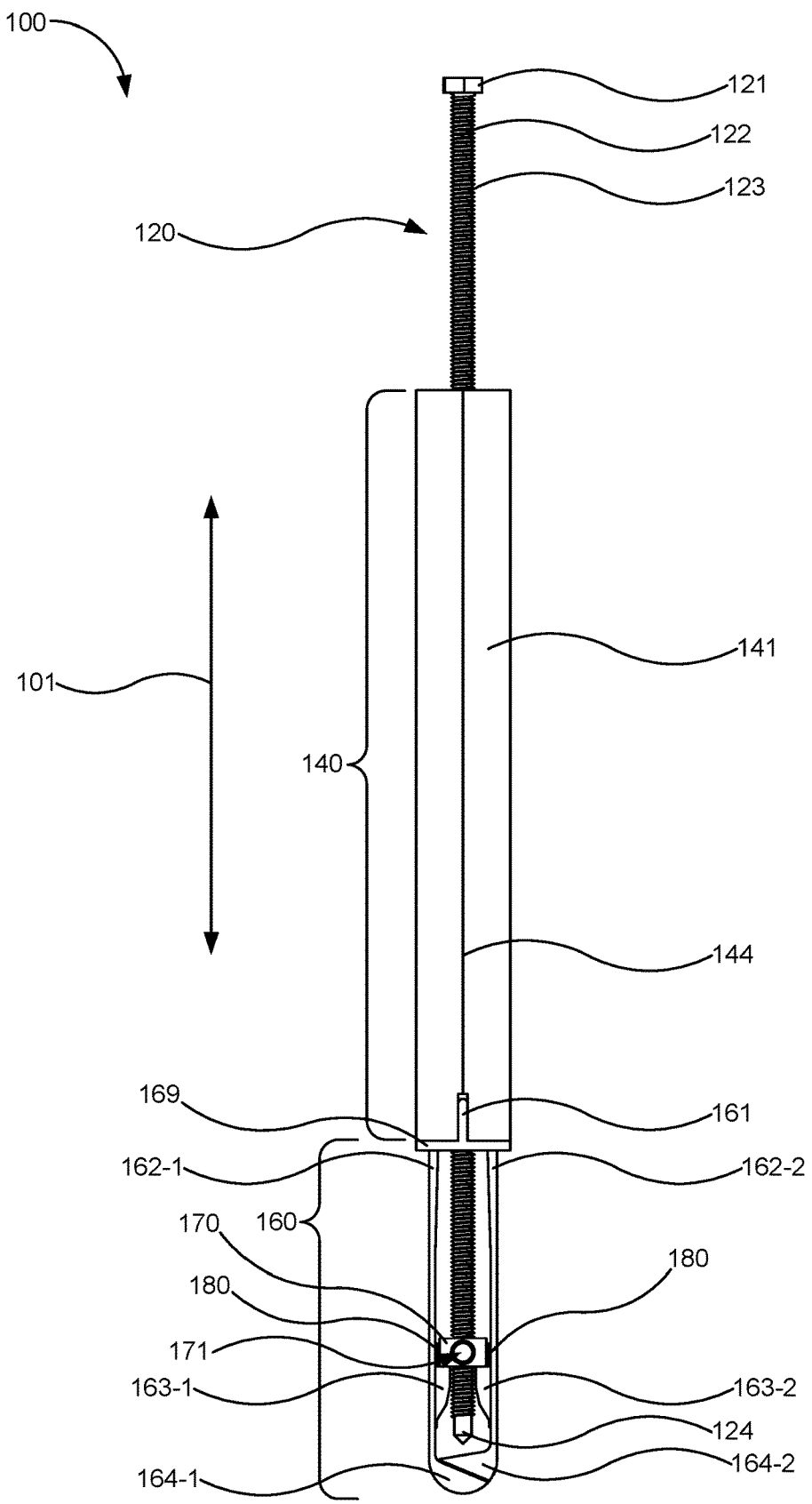
FIG. 2 is a plane view of the blind fastener, according to an example of the principles described herein.
Figure 3:
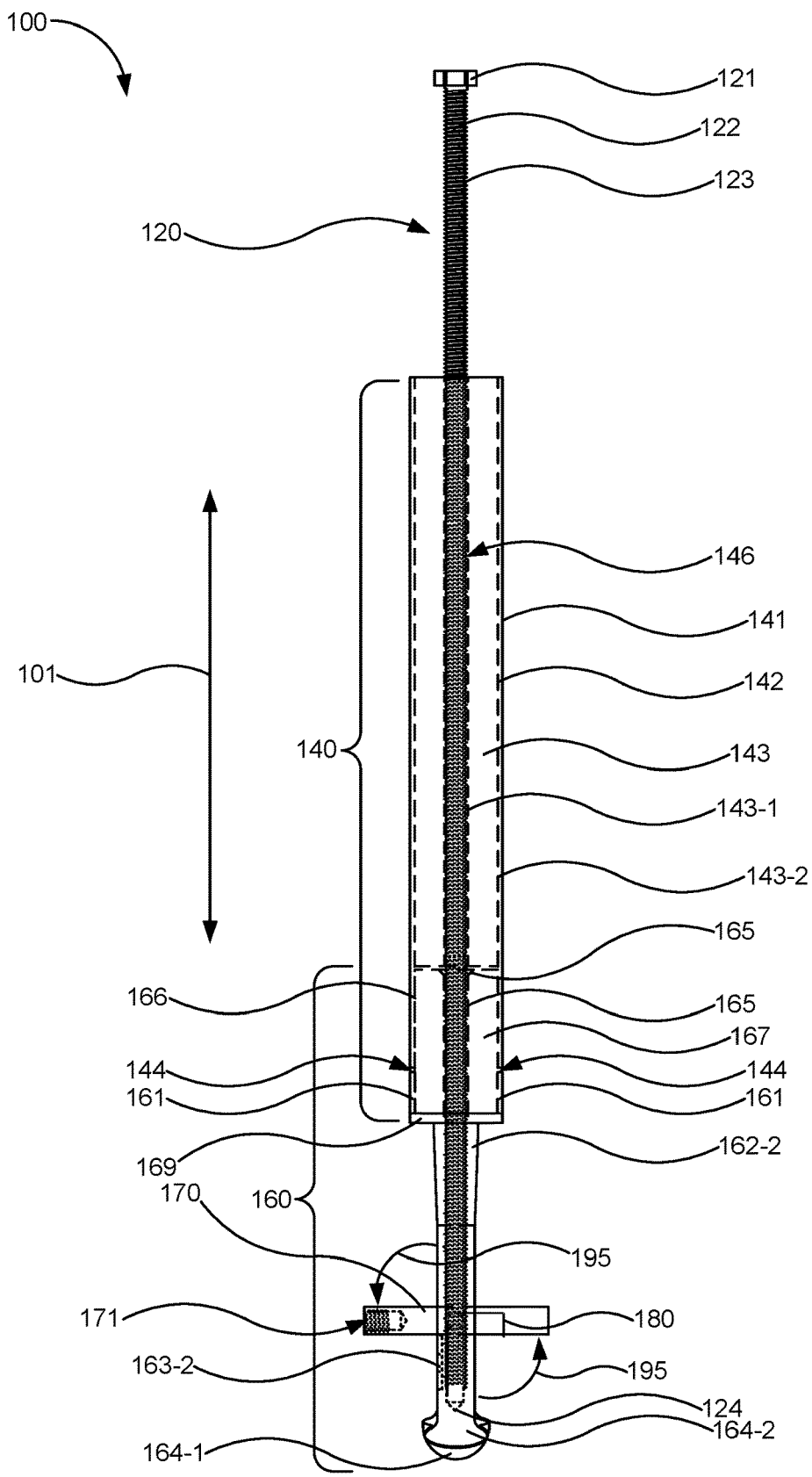
FIG. 3 is a cutaway, plane view of the blind fastener, according to an example of the principles described herein.

Wherever possible, the same reference numbers will be used throughout the drawings to refer to the same or like parts. Referring to FIG. 1, FIG. 1 is a perspective view of a blind fastener 100, according to an example of the principles described herein. FIG. 2 is a plane view of the blind fastener 100, according to an example of the principles described herein. FIG. 3 is a cutaway, plane view of the blind fastener 100, according to an example of the principles described herein. The blind fastener 100 described herein may be used to couple at least two elements together. These two elements may include at least two roofing materials used to form the roof of the building. Further, in another example, the blind fastener 100 may be used to couple devices to the roof of the building. For example, the blind fastener 100 may be used to couple heating, ventilation, and air conditioning (HVAC) devices and infrastructure, piping, and voice and data communication infrastructure and devices, among other infrastructure.

Figure 4:
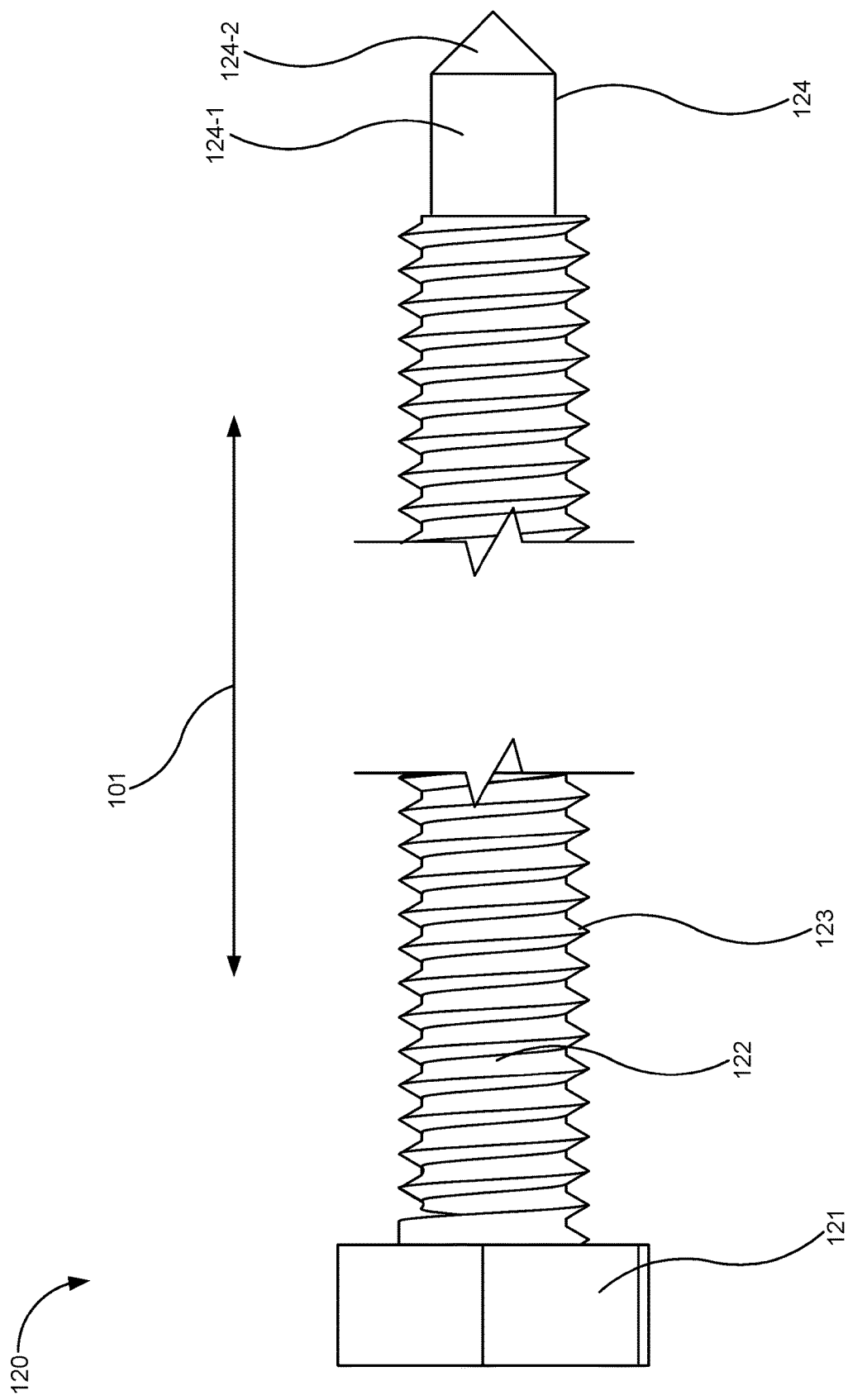
FIG. 4 is a plane view of a bolt of the blind fastener of FIG. 1, according to an example of the principles described herein.

The blind fastener 100 may include a bolt 120. FIG. 4 is a plane view of the bolt 120 of the blind fastener of FIG. 1, according to an example of the principles described herein. The bolt 120 may include a head 121 such as, for example, a hex head to allow for the bolt 120 to be rotated about its longitudinal axis of the bolt 120 (i.e. the longitudinal axis 101 of the blind fastener 100). The longitudinal axis 101 of the bolt 120 is parallel with by a shank 122 of the bolt coupled to the head 121 and running the remaining length of the bolt 120. The bolt 120 also includes external threads 123 on the outside at least a portion of the shank 122 of the bolt 120.

The bolt 120 may also include a tapered tip 124. The tapered tip 124 may include a threadless portion 124-1 where the external threads 123 stop and are no longer present on the shank 122. The tapered tip 124 also includes a tapered portion 124-2 where the shank 122 tapers to a point at which the shank 122 and the bolt 120 terminate opposite the head 121. The tapered tip 124 allows for a preliminary mating of the bolt 120 with a fastening block 170 as described in detail herein.

Figure 16:
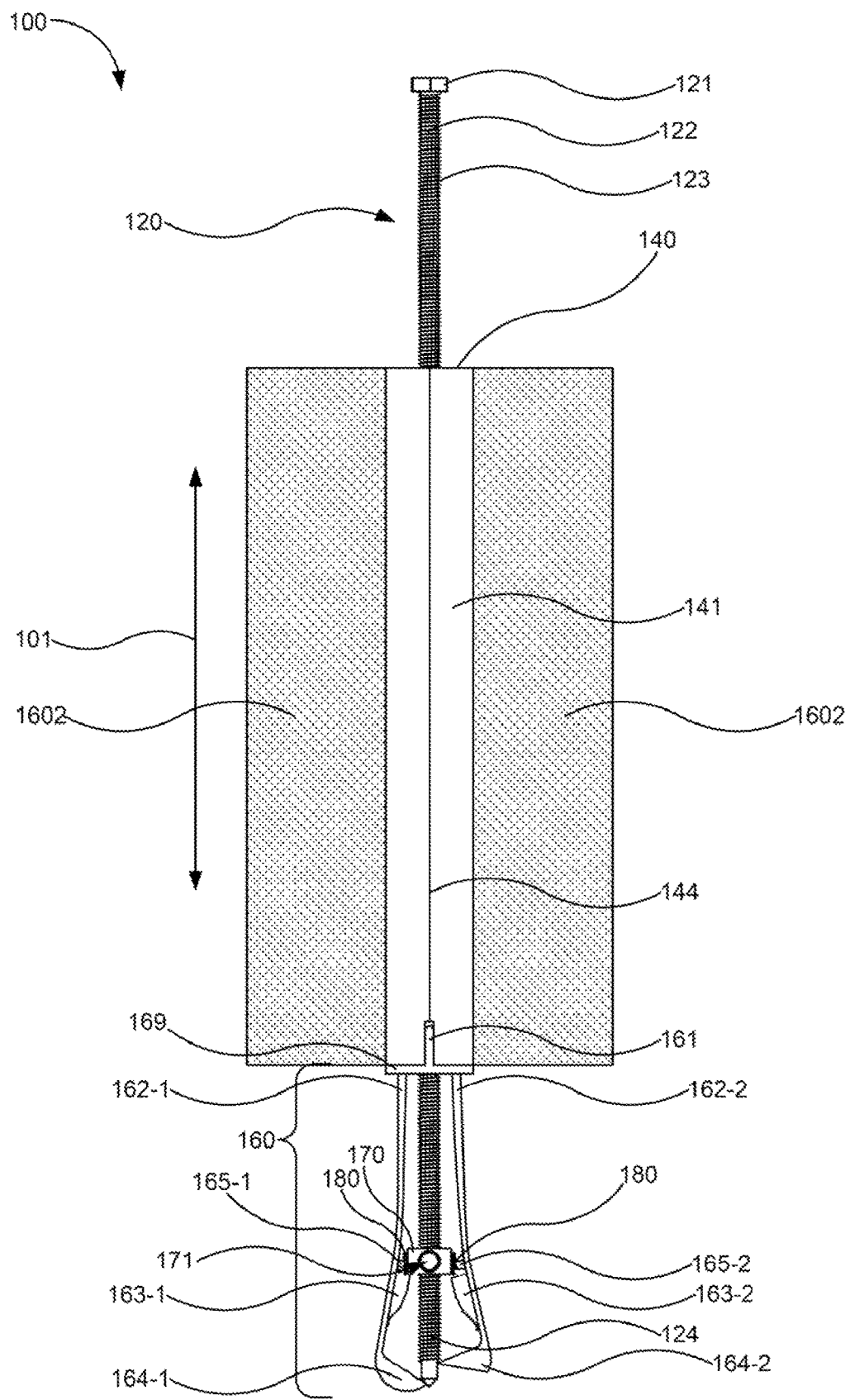
FIG. 16 is a plane view of the blind fastener engaged with a material, according to an example of the principles described herein.

The bolt 120 may include a nominal length including a grip length and a thread length, a length of the tapered tip 124, and/or the length of the shank 122 that is long enough to extend through any thickness of materials (FIG. 16, 1602) the blind fastener 100 is to extend. In one example, the blind fastener 100 may include a bolt 120 of any length to extend through the materials (FIG. 16, 1602). In one example, blind fasteners 100 may be offered for sale with a plurality of different lengths to allow for different thicknesses of materials (FIG. 16, 1602) to be coupled together using the blind fastener 100.

Figure 5:
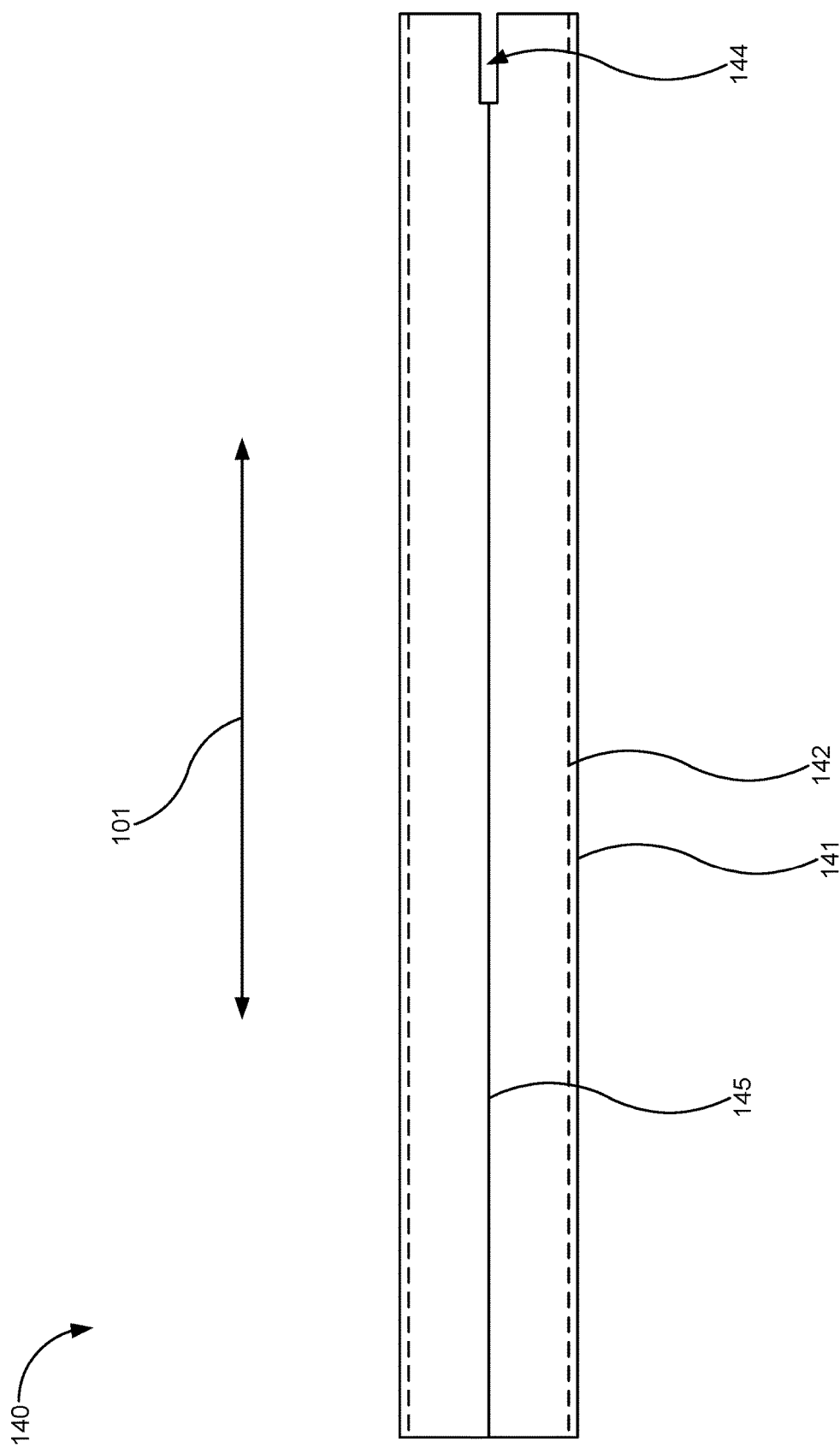
FIG. 5 is a plan view of a sleeve of the blind fastener of FIG. 1, according to an example of the principles described herein.

The blind fastener 100 may also include a sleeve 140. The sleeve 140 may circumvent the shank 122 such that a longitudinal axis of the sleeve 140 (i.e. the longitudinal axis 101 of the blind fastener 100) is parallel with the longitudinal axis 101 of the bolt 120. FIG. 5 is a plan view of the sleeve 140 of the blind fastener 100 of FIG. 1, according to an example of the principles described herein. The sleeve 140 may include a rigid cylinder having an outer surface 141 and an inner surface 142 (indicated by a shared dashed line with element 143-2 in FIG. 3). In this manner, the sleeve 140 includes a rigid, cylindrical shape. The sleeve 140 may be made of any rigid material that serves to carry the bolt 120, the insulation material 143, and the mount 160. In one example, the sleeve 140 may be made of polyvinyl chloride (PVC), polyethylene (PE), polypropylene (PP), polyvinyl fluoride (PVF), acrylonitrile butadiene styrene (ABS), plastics, rubbers, metals, metal alloys, and other rigid materials.

As depicted in FIGS. 3 and 5, the sleeve 140 includes at least one notch 144 defined within an end of the sleeve 140 to engage with a protrusion 161 formed in a mount 160 of the blind fastener 100 as described in more detail herein. In the examples described herein, the sleeve 140 may include two notches 144 defined within the sleeve 140, and the mount 160 correspondingly includes two protrusions 161 formed in the mount 160.

Figure 6:
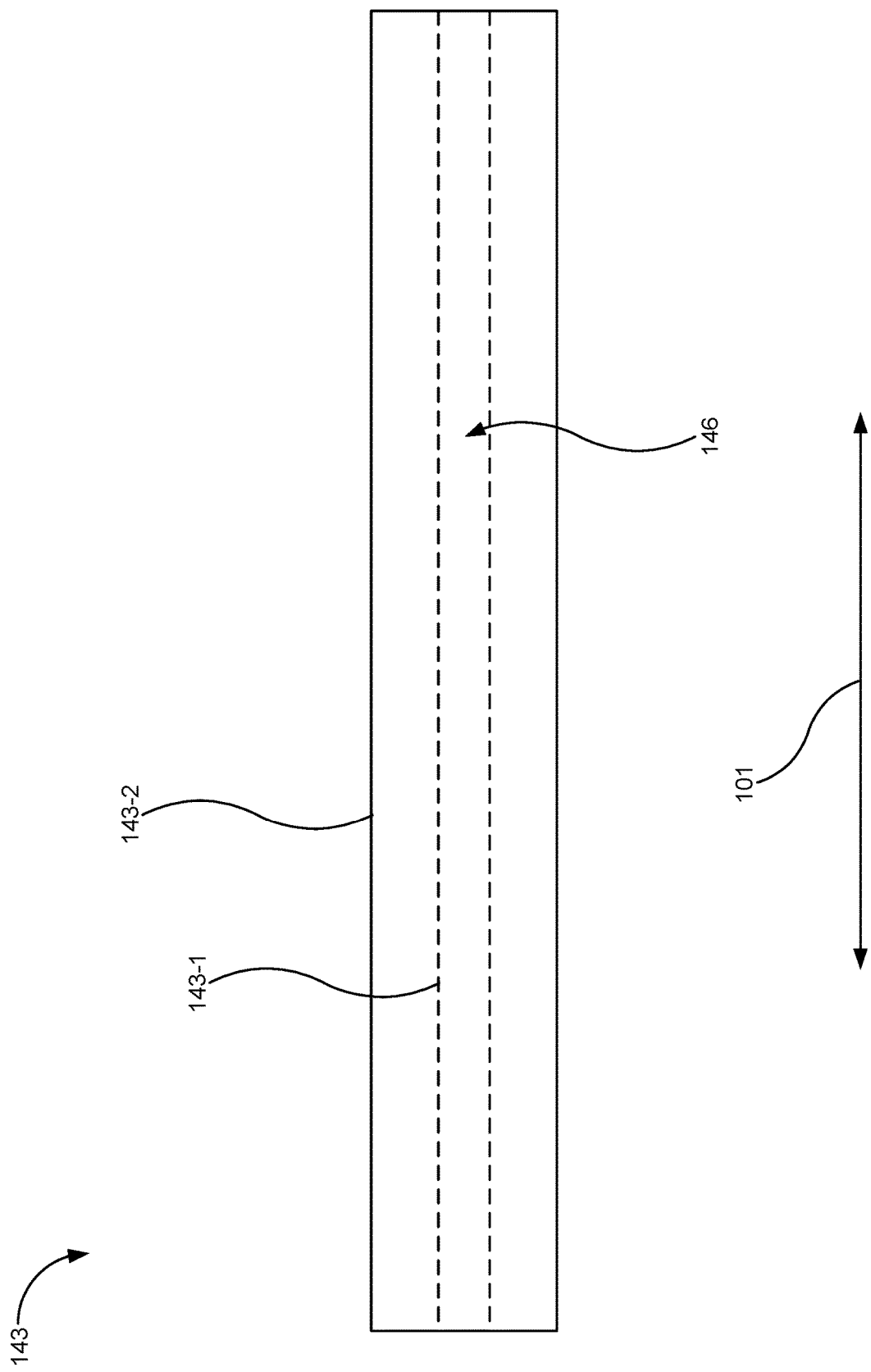
FIG. 6 is a plan view of an insulating material that fills the sleeve of the blind fastener of FIGS. 1 and 5, according to an example of the principles described herein.

In one example, at least a portion of the interior of the sleeve 140 may include an insulating material 143. The insulating material 143 may serve as a core to the sleeve 140 to provide structural rigidity. Further, the insulating material 143 may insulate an interior of a structure such as a roof in which the blind fastener 100 is inserted. Thus, the insulating material 143 serves to ensure that environmental elements such as varying external temperatures, sound, precipitation, and other environmental elements do not permeate into the interior of the structure via the blind fastener 100. FIG. 6 is a plan view of the insulating material that fills the sleeve 140 of the blind fastener 100 of FIGS. 1 and 5, according to an example of the principles described herein. The insulating material 143 may be any material that fills the interior of the cylinder shape of the sleeve 140. For example, the insulating material 143 may include foam, air, polyurethane, polystyrene, Thinsulate®, polyisocyanurate, aerogel, cardboard, cellulose, wood, fiberglass, other insulting materials, and combinations thereof. The insulating material 143 may include an exterior surface 143-2 that extends to the inner surface 142 of the sleeve 140.

The insulating material 143 may also include an inner surface 143-1 that defines an inner channel 146 through which the bolt 120 extends. In one example, the insulating material 143 may loosely interface with the bolt 120 such that the bolt 120 may move freely within the interior of the insulating material 143 with relatively little interfacing of the bolt 120 with the insulating material 143. In another example, the insulating material 143 may form an interference fit of any tolerance with the bolt 120 such that the bolt 120 moves through the insulating material 143 as the bolt is turned. In this example, the external threads 123 of the bolt 120 may engage with the inner surface 143-1 of the insulating material 143.

Figure 7:
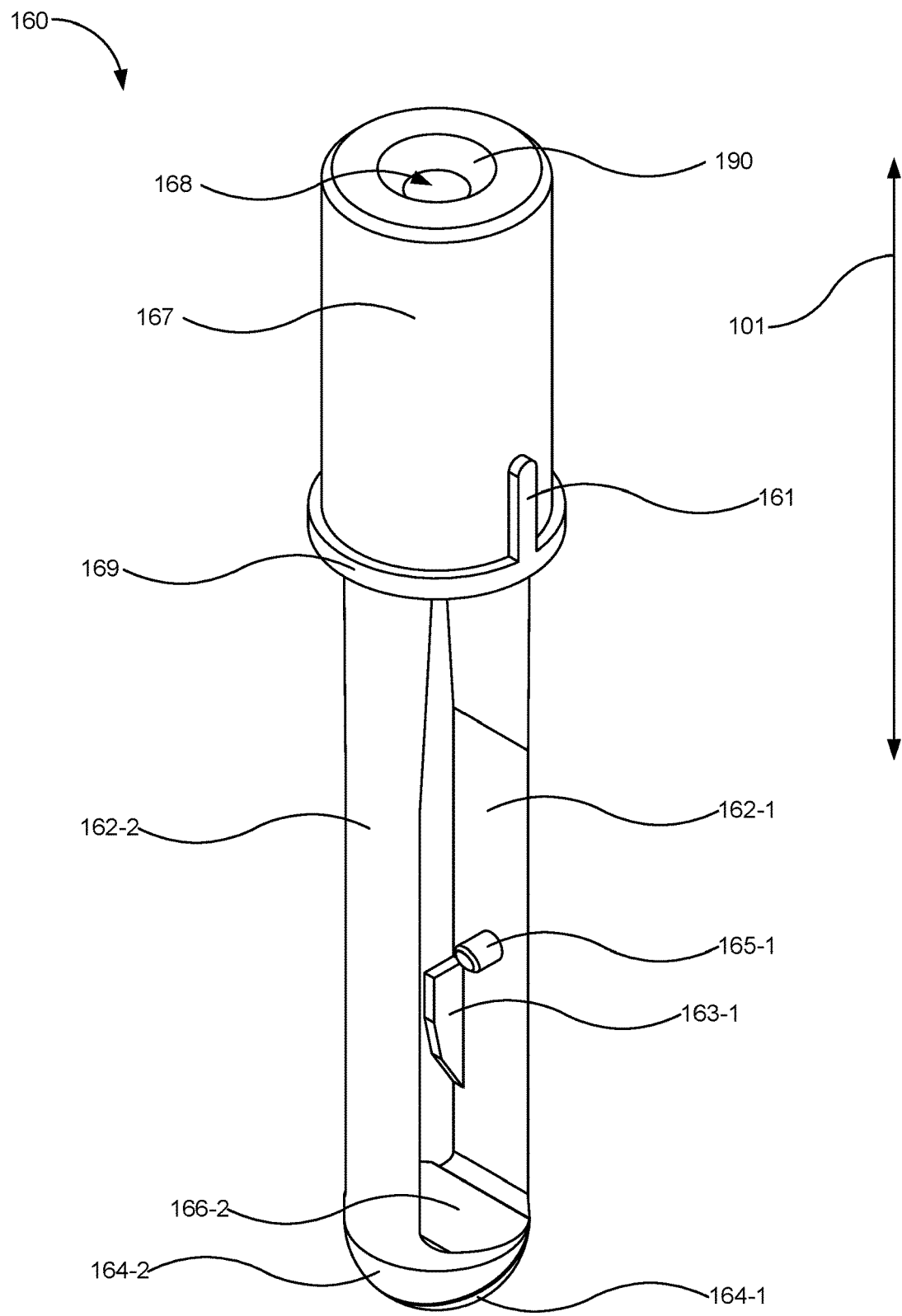
FIG. 7 is a perspective view of a mount for mounting a fastening block at a first orientation, according to an example of the principles described herein.
Figure 8:
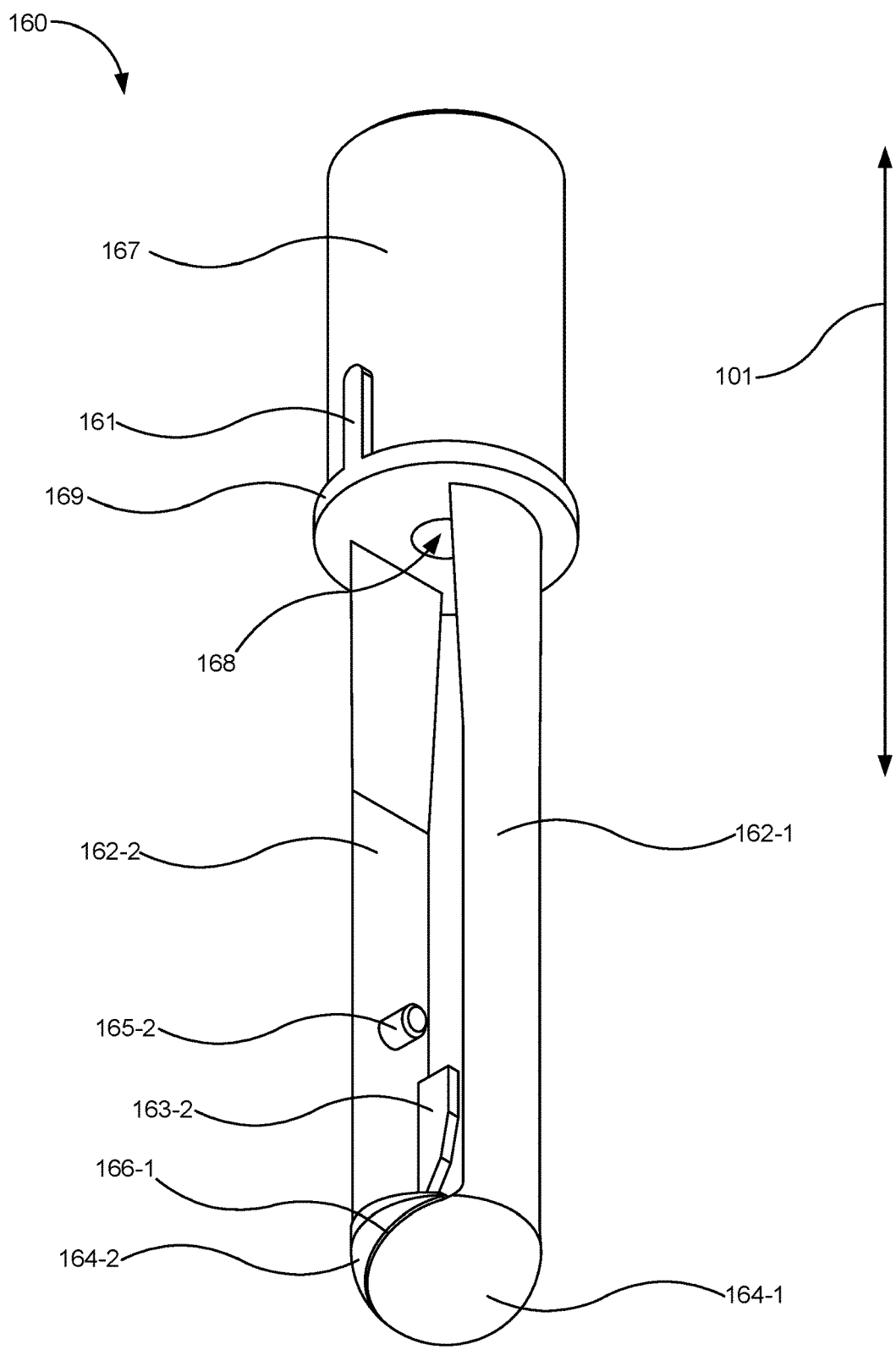
FIG. 8 is a perspective view of a mount for mounting a fastening block at a second orientation, according to an example of the principles described herein.
Figure 9:
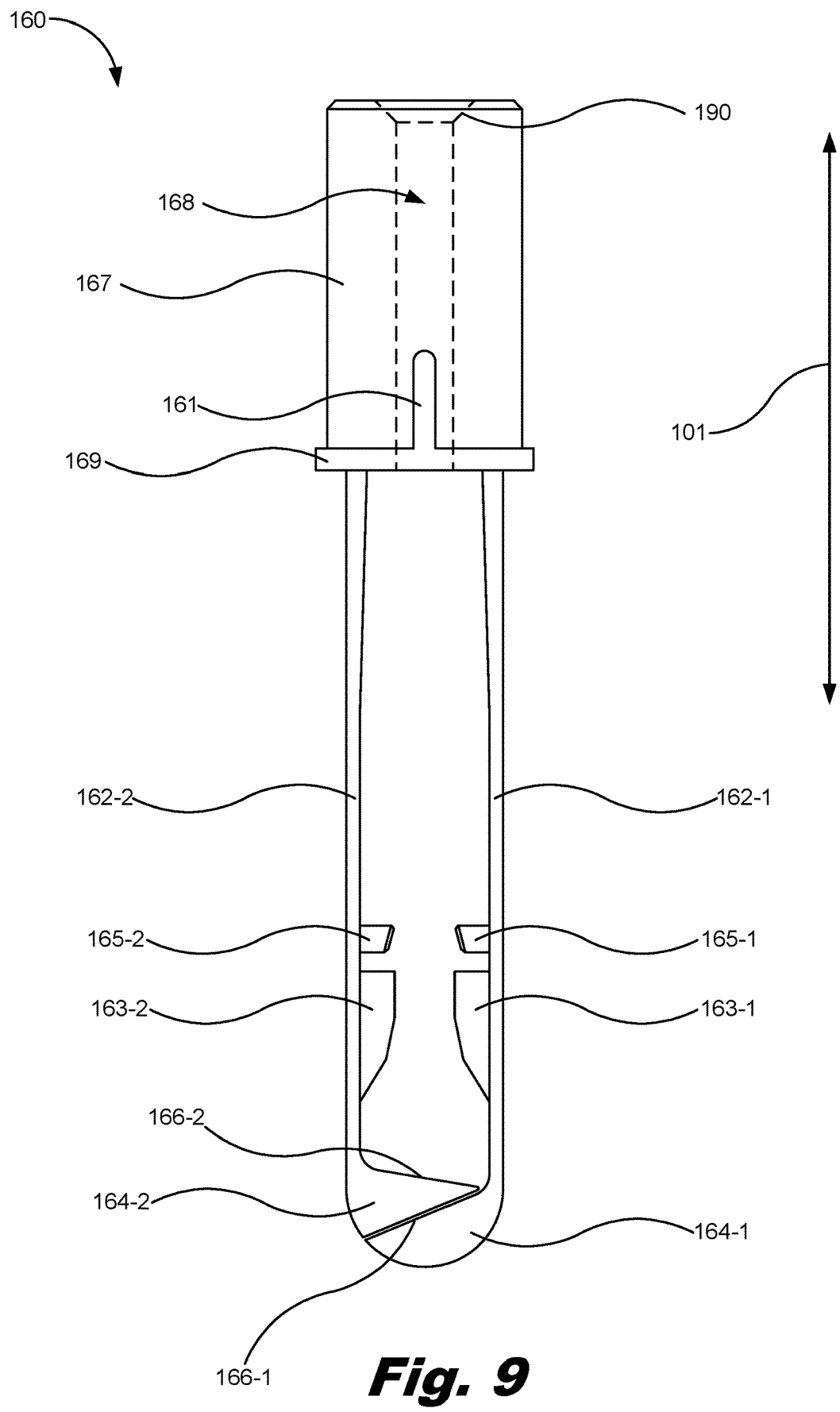
FIG. 9 is a plan view of a mount for mounting a fastening block at a third orientation, according to an example of the principles described herein.
Figure 10:
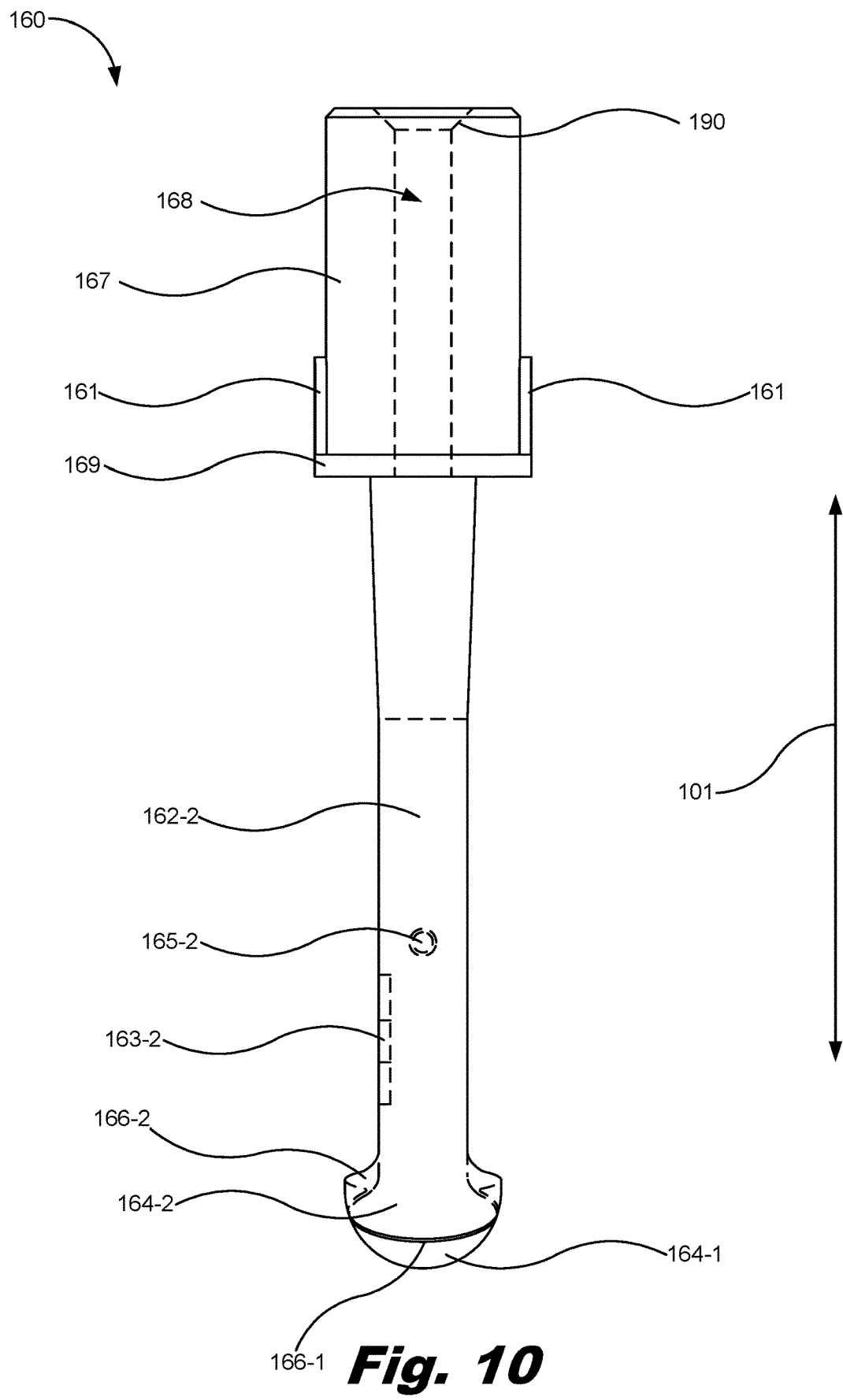
FIG. 10 is a perspective view of a mount for mounting a fastening block at a fourth orientation, according to an example of the principles described herein.
Figure 12:
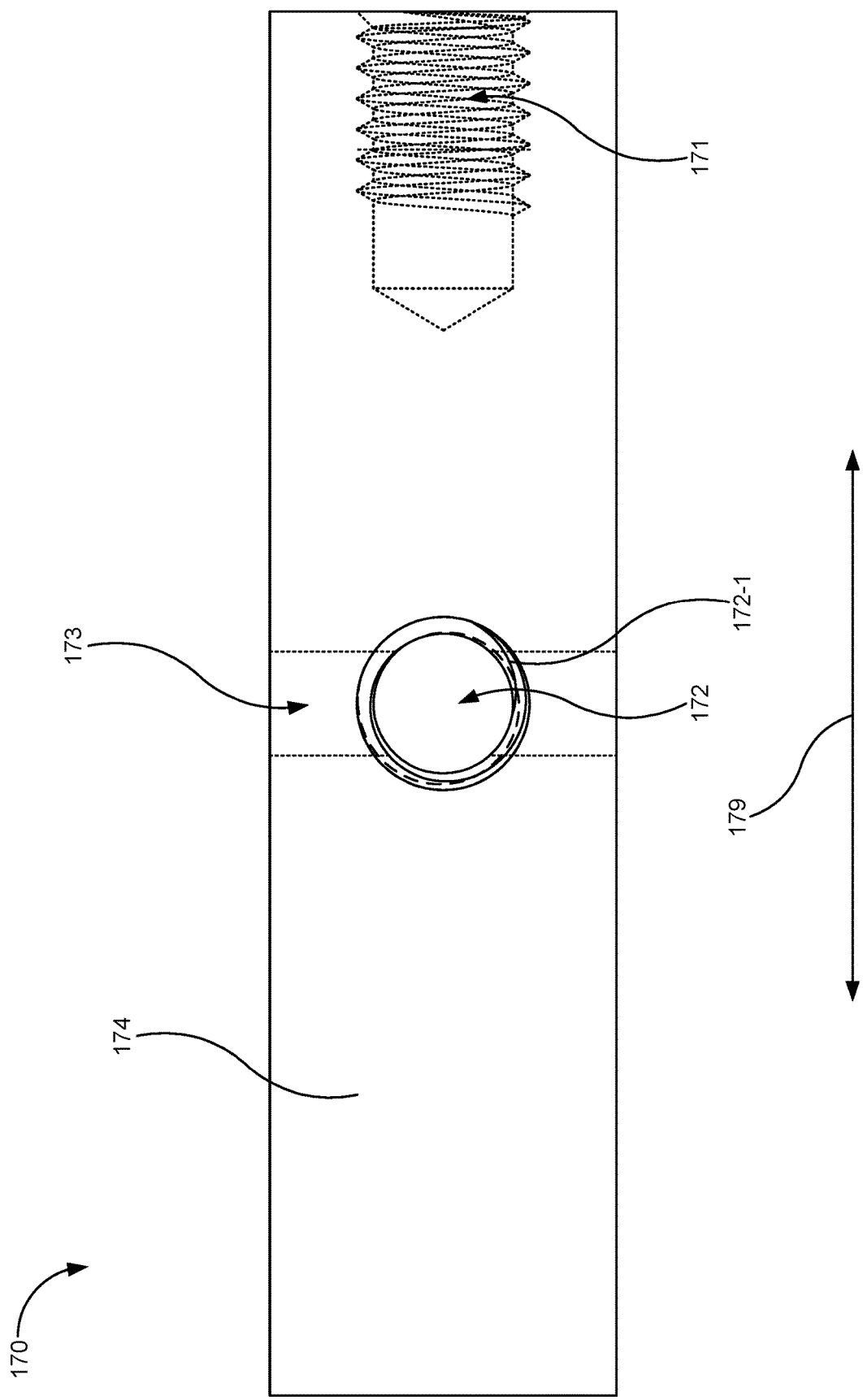
FIG. 12 is a plan view of a fastening block of the blind fastener of FIG. 1 at a second orientation, according to an example of the principles described herein.
Figure 13:
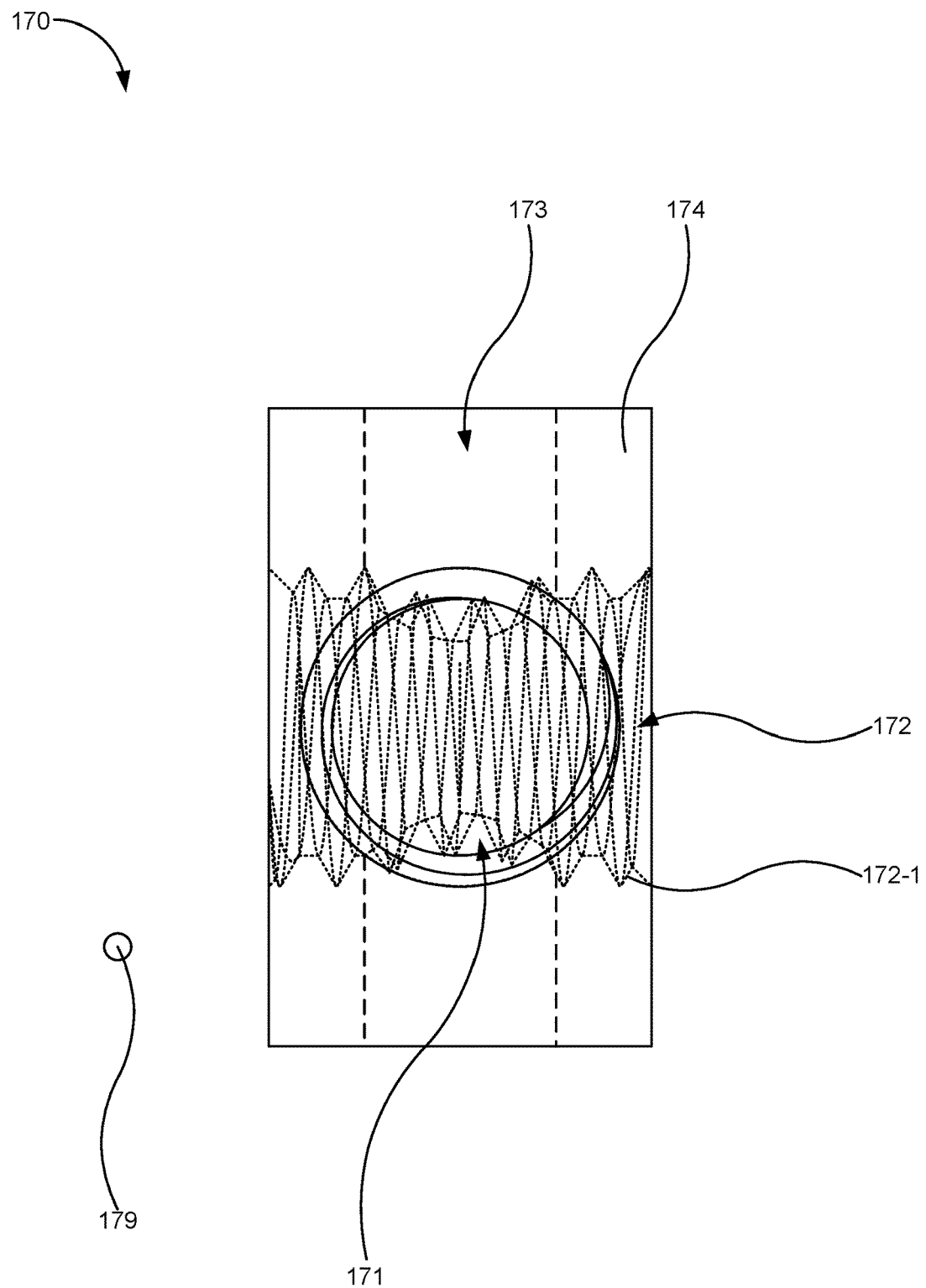
FIG. 13 is a plan view of a fastening block of the blind fastener of FIG. 1 at a third orientation, according to an example of the principles described herein.
Figure 14:
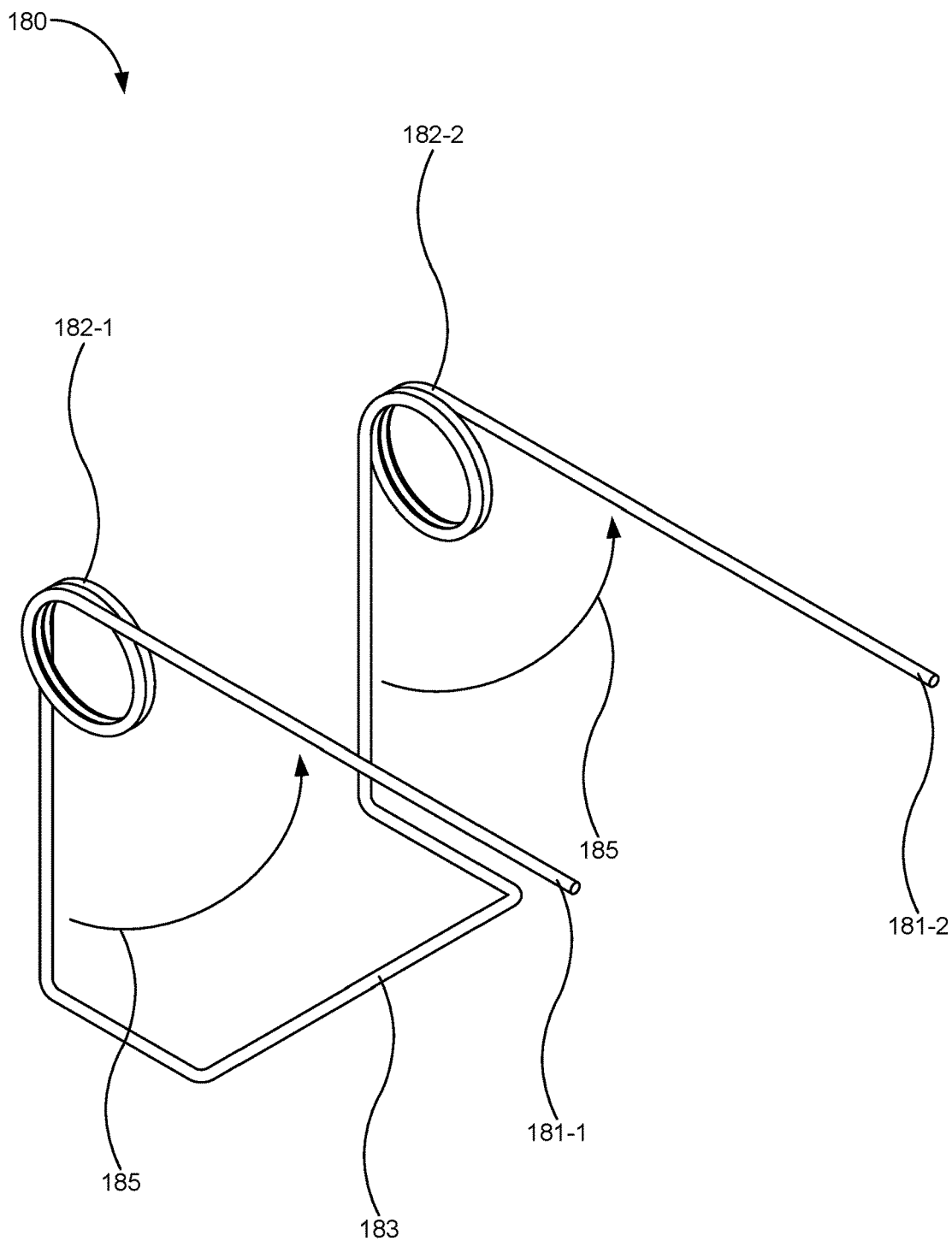
FIG. 14 is a perspective view of an orientation spring of the blind fastener of FIG. 1, according to an example of the principles described herein.
Figure 15:
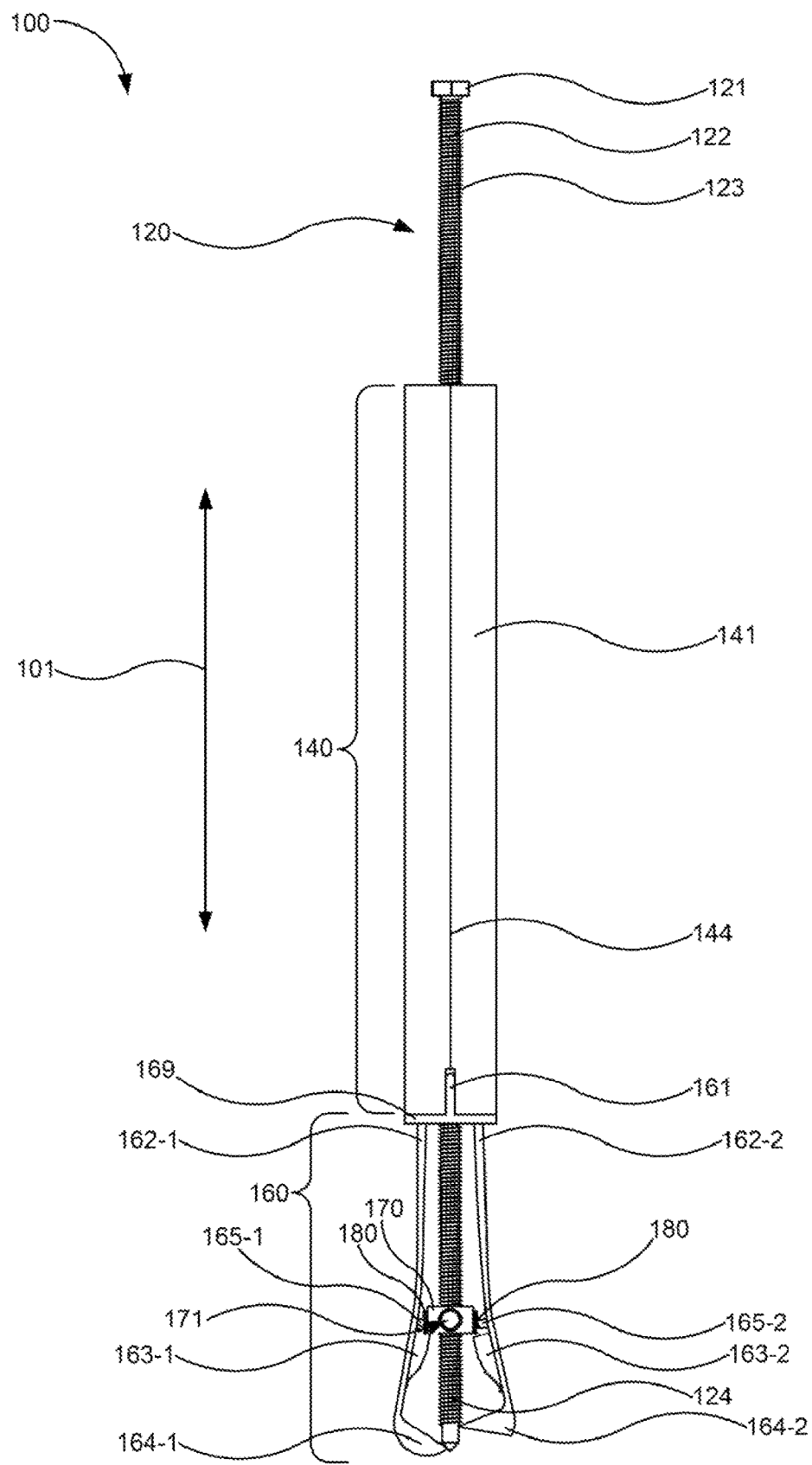
FIG. 15 is a plane view of the blind fastener in a disengaged state, according to an example of the principles described herein.

The sleeve 140 may also engage with a mount 160 at an end of the sleeve 140 opposite the side of the sleeve 140 at which the head 121 of the bolt 120 is located. FIG. 7 is a perspective view of the mount 160 for mounting a fastening block 170 at a first orientation, according to an example of the principles described herein. FIG. 8 is a perspective view of the mount 160 for mounting the fastening block 170 at a second orientation, according to an example of the principles described herein. FIG. 9 is a plan view of the mount 160 for mounting the fastening block 170 at a third orientation, according to an example of the principles described herein. FIG. 10 is a perspective view of the mount 160 for mounting the fastening block 170 at a fourth orientation, according to an example of the principles described herein. FIG. 15 is a plane view of the blind fastener 100 in a disengaged state, according to an example of the principles described herein. The fastening block 170 is depicted in FIGS. 12 through 14 and is described in more detail herein.

The mount 160 may be made of, for example, a plastic or other material that may deform in the presence of an applied force and return to its original shape when the force is removed. This allows for arms 162-1, 162-2 that extend from a body 167 of the mount to deform from an original position as depicted in, for example, FIGS. 7 through 10 to a position in which the fastening block 170 is able to disengage from the mount 160 as depicted in FIG. 15.

The body 167 of the mount 160 engages with an end of the sleeve 140 via the protrusions 161 engaging with the notches 144 defined within the sleeve 140. In one example, the body may include a width or diameter that creates an interference fit of any tolerance with the inner surface 142 of the sleeve 140. In this manner, the body 167 of the mount 160 may couple to the sleeve 140 without the use of a fastener. In another example, the body 167 of the mount 160 may be coupled to the inner surface 142 of the sleeve 140 via a fastener such as, for example, a PVC solvent cement, a flanging, a threading, or mechanical joining. The mount 160 may include a ridge 169 wider than the inner surface 142 of the sleeve 140 and narrower than the outer surface 141 of the sleeve 140. The protrusions 161 may extend a radial distance from the body 167 of the mount 160 a distance that is equal to the diameter of the ridge 169 so as to protrude through the thickness of the sleeve 140 (i.e., the distance between the inner surface 142 and the outer surface 141 of the sleeve 140) and not extend past a diameter of the sleeve 140. This allows for the protrusions 161 to engage with the sleeve 140 while also causing the protrusions 161 to not impede the insertion of the blind fastener 100 into a drilled hole that is approximately equal to the diameter of the sleeve 140. The ridge 169 and protrusions 161 may include outer dimensions that extend as far as the outer surface 141 of the sleeve 140. This allows the surfaces of the blind fastener 100 to be equivalent such that when the blind fastener 100 is extended through an aperture in the material(s) such as the roofing materials, no surface of the blind fastener 100 may be caught on the edges of the aperture or otherwise inhibit the insertion of the blind fastener 100 into the aperture.

The body 167 of the mount 160 includes an aperture 168 through which the bolt 120 may extend. The aperture 168 extends through an entirety of the body 167 of the mount 160. The mount 160 may also include an inclined entry 190 between a top of the mount 160 and the aperture 168. The inclined entry 190 allows for the tapered portion 124-2 of the bolt 120 to slidingly engage with the mount 160 as the bolt 120 is caused to engage with the mount 160. In one example, the aperture 168 may not include internal threads with which the external threads 123 of the bolt 120 may engage in order to allow the fastening block 170 to be drawn toward the bottom of the mount 160. In this example, the internal portion of the aperture 168 may be dimensioned to allow the external threads 123 of the bolt 120 to move unhindered by and unengaged with the mount 160 via the external threads 123. In another example, the aperture 168 may include internal threads with which the external threads 123 of the bolt 120 may engage. In yet another example, the external threads 123 of the bolt 120 may form internal threads within the aperture 168 as the bolt enters the aperture 168 and displaces material within the aperture 168 to form the internal threads.

In the examples described herein, the mount 160 includes two arms 162-1, 162-2 that are formed on and extend from a bottom of the body 167 of the mount 160. The arms 162-1, 162-2 include pivot mounts 165-1, 165-2 formed on and extending from an interior side of the arms 162-1, 162-2. The pivot mounts 165-1, 165-2 are positioned on the arms 162-1, 162-2 and dimensioned such that pivot mounts 165-1, 165-2 are able to engage with a pivot aperture 173. It is via the pivot mounts 165-1, 165-2 and the pivot aperture 173 by which the fastening block 170 pivots as described herein.

Figure 11:
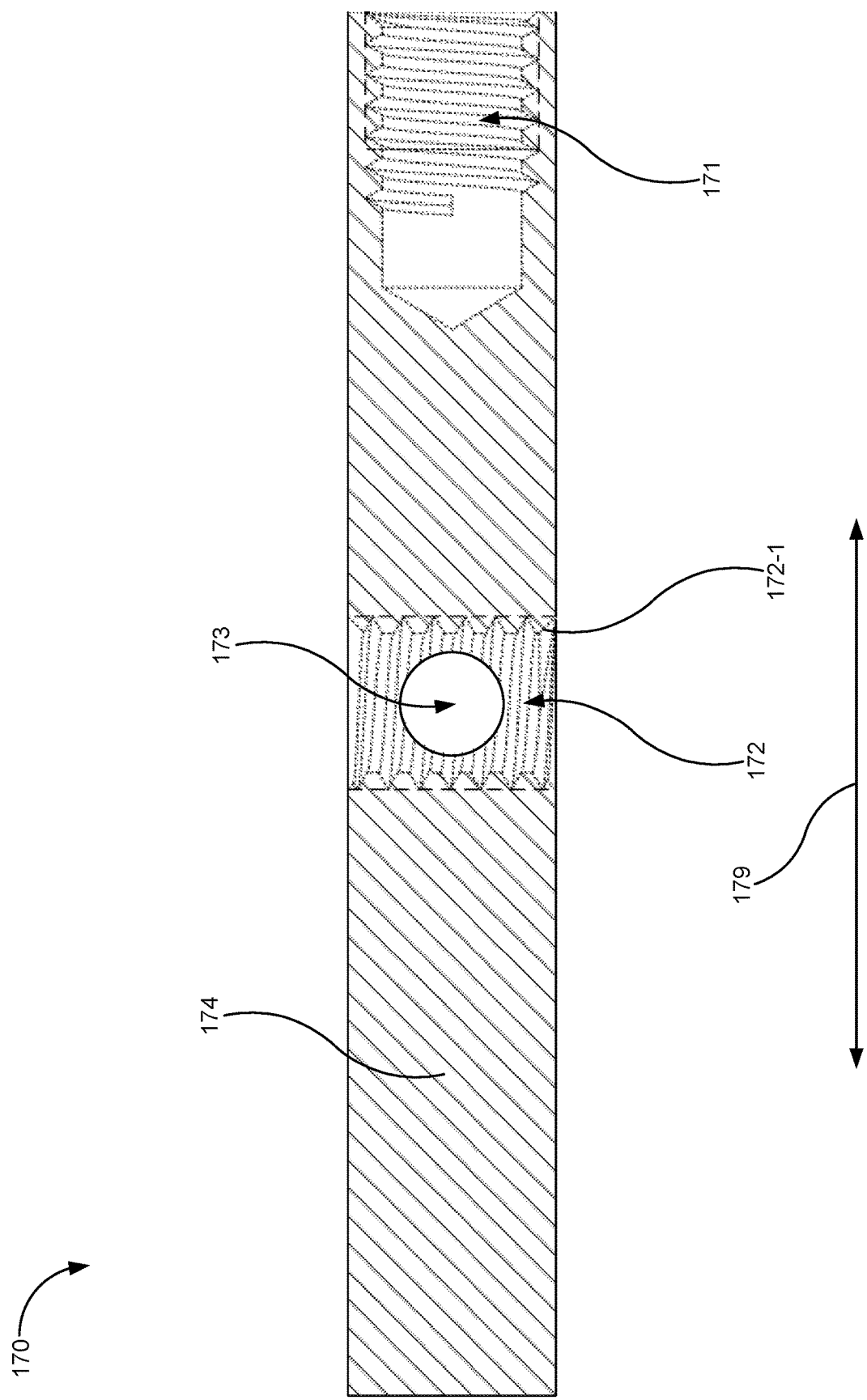
FIG. 11 is a plan view of a fastening block of the blind fastener of FIG. 1 at a first orientation, according to an example of the principles described herein.

The two arms 162-1, 162-2 may also include at least one flange 163-1, 163-2 formed on and extending from the interior side of the arms 162-1, 162-2. In the examples described herein, the mount 160 includes two flanges 163-1, 163-2. The flanges 163-1, 163-2 support the fastening block 170 when the fastening block 170 is pivoted about the pivot mounts 165-1, 165-2 and via the pivot aperture 173 from a first orientation to a second orientation. The first orientation includes an orientation where a longitudinal axis 179 (FIGS. 11 through 13) of the fastening block 170 is parallel with the longitudinal axis 101 of the bolt 120. The second orientation includes an orientation where the longitudinal axis 179 of the fastening block 170 is perpendicular with the longitudinal axis 101 of the bolt 120 as indicated in FIGS. 1 and 3 by arrow 195. More regarding shifts in the orientation of the fastening block 170 is described in more detail herein.

The two arms 162-1, 162-2 may also include inclined terminals 164-1, 164-2. The inclined terminals 164-1, 164-2 include inclined planes 166-1, 166-2. As depicted in FIGS. 1 through 3, 7 through 11, 15, and 16 the two inclined terminals 164-1, 164-2 may be two separate halves of a spherical or domed terminus. A first inclined plane 166-1 on a first inclined terminal 164-1 is formed by a diagonal division between the first inclined terminal 164-1 and the second inclined terminal 164-2. The second inclined plane 166-2 on the second inclined terminal 164-2 is formed by an inclined surface formed on a top side of the second inclined terminal 164-2. The inclined planes 166-1, 166-2 allow for the bolt 120 to push along the inclined planes 166-1, 166-2 once the bolt is extended through the fastening block 170 as depicted in FIG. 15. Once the bolt 120 reaches the inclined terminals 164-1, 164-2, the tapered tip 124 of the bolt 120 engages with the inclined planes 166-1, 166-2 and causes the arms 162-1, 162-2 of the mount 160 to deflect outward away from the fastening block 170 and the bolt 120. The bolt 120 may then move past the inclined terminals 164-1, 164-2 and beyond the end of the mount 160 as the bolt 120 is turned. This outward deflection of the arms 162-1, 162-2, in turn, causes the pivot mounts 165-1, 165-2 to disengage with the pivot aperture 173 formed in the fastening block 170 as depicted in FIG. 15. More regarding the function of the blind fastener 100 and the mount 160 and fastening block 170 is described herein.

The blind fastener 100 also includes the fastening block 170 described herein. With continued reference to FIGS. 1 through 10, FIG. 11 is a plan view of a fastening block 170 of the blind fastener 100 of FIG. 1 at a first orientation, according to an example of the principles described herein. FIG. 12 is a plan view of the fastening block 170 of the blind fastener 100 of FIG. 1 at a second orientation, according to an example of the principles described herein. FIG. 13 is a plan view of the fastening block 170 of the blind fastener 100 of FIG. 1 at a third orientation, according to an example of the principles described herein. FIG. 14 is a perspective view of an orientation spring 180 of the blind fastener 100 of FIG. 1, according to an example of the principles described herein. The fastening block 170 acts as a nut or similar companion fastener with the bolt 120 to couple at least two elements together such as, for example, roofing materials through which the blind fastener 100 is inserted. The fastening block 170 may be made of any material capable of withstanding compression forces placed on the fastening block 170 as the fastening block 170 engages with the bolt 120.

It may be beneficial to describe the method by which the blind fastener 100 is implemented in coupling the at least two elements together. The fastening block may include a body 174 with the longitudinal axis 179 described herein. In the examples described herein, the body 174 may have a rectangular cuboid shape with two distal ends with respect to the longitudinal axis 179.

Further, the fastening block may include a threaded cavity 171. The bolt 120 engages with the threaded cavity 171 at an outset of the process of implementing the blind fastener 100. At the outset of implementing the blind fastener 100, a user may drill a hole in the materials (FIG. 16, 1602) through which the blind fastener 100 is to be inserted. In one example, the user may desire to couple a device, mount, rigging, stanchion, or other roof-top element to the roof of a structure. In so doing, the hole may be drilled through roofing materials, b-deck layers, concrete layers, and other layers of material (FIG. 16, 1602) that may exist within the roof of the structure. In another example, the user may desire to couple an element to the interior ceiling of the structure or a side wall of the structure. In these examples, a hole is drilled in the structure to couple an additional element to the structure as similarly described in connection with the roof-top example.

The blind fastener 100 may be inserted through an aperture in the element (i.e., an aperture formed within the element) that is to be coupled to the structure and inserted into the drilled hole. The coupling of the bolt 120 to the fastening block 170 via the threaded cavity 171 ensures that a longitudinal axis 179 of the fastening block 170 is parallel with the longitudinal axis 101 of the blind fastener 100, the bolt 120, the sleeve 140, the insulating material 143, and the mount 160 as depicted in FIGS. 1 through 10. The threaded cavity 171 may include internal dimensions and shape that match the exterior dimensions and shape of the tapered tip 124 including the external threads 123, the threadless portion 124-1, and the tapered portion 124-2 when the bolt 120 is engaged with the fastening block 170 via the threaded cavity 171.

Once the blind fastener 100 is inserted through an aperture and the fastening block 170 clears opening of the aperture opposite the side of the aperture through which the blind fastener 100 is inserted, the tapered tip 124 of the bolt 120 may be disengaged from the threaded cavity 171. Once the tapered tip 124 is disengaged from the threaded cavity 171, the orientation spring 180 causes the fastening block 170 to move from the first orientation where the longitudinal axis 179 (FIGS. 11 through 13) of the fastening block 170 is parallel with respect to the longitudinal axis 101 of the bolt 120 to the second orientation where the longitudinal axis 179 of the fastening block 170 is perpendicular with respect to the longitudinal axis 101 of the bolt 120.

In the examples described herein, the orientation spring 180 may include a torsional spring that includes two coils 182-1, 182-2 that are subjected to twisting about the axis of a first coil 182-1 and a second coil 182-2 by sideways forces (i.e., bending moments) applied to distal ends of a first spring arm 181-1, a second spring arm 181-2, and a lateral spring arm 183. Forces applied in the direction opposite of the arrows 185 depicted in FIG. 4 twists the coils 182-1, 182-2 tighter creating a state where mechanical energy is stored and a torque is exerted in the direction as indicated by arrow 185 and proportional to the angle at which the first spring arm 181-1, the second spring arm 181-2 are twisted relative to the lateral spring arm 183. Thus, in the examples described herein, the orientation spring 180 is biased to move to the state depicted in FIG. 14 as indicated by arrows 185. Further, when the bolt 120 is engaged with the fastening block 170 via the threaded cavity 171, the first spring arm 181-1, the second spring arm 181-2 are twisted relative to the lateral spring arm 183, and the coils 182-1, 182-2 are twisted tighter creating the state where mechanical energy is stored. This mechanical energy is released when the tapered tip 124 of the bolt 120 is disengaged from the threaded cavity 171. The stored mechanical energy of the orientation spring 180 moves the fastening block to the position depicted in, for example, FIGS. 1 through 3 to the second orientation where the longitudinal axis 179 of the fastening block 170 is perpendicular with respect to the longitudinal axis 101 of the bolt 120. Again, the second orientation includes an orientation where the longitudinal axis 179 of the fastening block 170 is perpendicular with the longitudinal axis 101 of the bolt 120 as is indicated in FIGS. 1 and 3 by arrow 195.

Once the fastening block 170 is placed in the second orientation as indicated in FIGS. 1 and 3 by arrow 195, the bolt 120 may be reengaged with the fastening block 170. Turning again to FIGS. 11 through 13, the fastening block 170 may include a threaded aperture 172. The internal threads 172-1 of the threaded aperture 172 mate with the external threads 123 of the bolt 120. Further, the threaded aperture 172 is defined within a portion of the fastening block 170 that aligns with the axis of the bolt 120 such that when the fastening block 170 is force in the direction of arrow 195 in FIGS. 1 and 3, the bolt 120 may be twisted and engaged with the threaded aperture 172. With the fastening block 170 in the orientation depicted in FIGS. 1 through 3, the ends of the fastening block extend past the aperture drilled into the portion of the structure through which the blind fastener 100 is inserted into. In this manner, the ends of the fastening block 170 serve to create a surface against which the head 121 of the bolt 120 may pull on order to secure the elements to the portion of the structure.

Thus, in operation and in an instance where, for example, a stanchion or other fall protection device is being coupled to the roof of the structure, the blind fastener 100 may be inserted through an aperture of the stanchion and the aperture drilled into the roof material(s) (FIG. 16, 1602). The bolt 120 may be disengaged from the threaded cavity 171 of the fastening block 170 by rotating the bolt 120 in a first direction. The fastening block 170 may rotate about the pivot mounts 165-1, 165-2 of the mount 160 and the pivot aperture 173 defined in the fastening block 170 to the second orientation as indicated by arrow 195 in FIGS. 1 and 3. A user may re-engage the bolt 120 with the fastening block 170 via the threaded aperture 172 by rotating the bolt 120 in a second direction opposite the first direction. As the bolt 120 is rotated in the second direction, the bolt 120 fully engages with the threaded aperture 172 and the external threads 123 of the bolt 120 and the internal threads 172-1 of the threaded aperture 172 pull the stanchion and the roofing material(s) (FIG. 16, 1602) together.

In one example, as the bolt 120 rotates in the second direction, the bolt 120 moves past the first inclined terminal 166-1 and the second inclined terminal 166-2 pushing the first inclined terminal 166-1 and the second inclined terminal 166-2 apart from one another and pushing the first arm 162-1 and the second arm 162-2 apart from one another. As the first arm 162-1 and the second arm 162-2 move apart from one another, the pivot mounts 165-1, 165-2 formed on and extending from an interior side of the arms 162-1, 162-2 disengage from the pivot aperture 173. Once the pivot mounts 165-1, 165-2 disengage from the pivot aperture 173, the fastening block 170 separates from the mount 160 while the arms 162-1, 162-2 maintain the fastening block 170 in the same orientation without rotating along with the bolt 120.

The orientation of the fastening block 170 may be maintained to ensure that the ends of the fastening block 170 properly engage with the distal side of the roof material(s) (FIG. 16, 1602) relative to the end of the aperture in the roofing material(s) (FIG. 16, 1602) through which the blind fastener 100 is first inserted. For example, the distal side of the roof material(s) (FIG. 16, 1602) may include a corrugated cross-section including a series parallel ridges and furrows. The fastening block 170 may be rotationally oriented within the aperture drilled into the roofing material(s) (FIG. 16, 1602) such that the fastening block 170 is oriented in the second orientation depicted in FIGS. 1 through 3 to be parallel with the ridges and furrows of the roofing material(s). (FIG. 16, 1602) In order to assist a user in knowing the orientation of the fastening block 170 of the blind fastener 100 without being able to see the distal end of the blind fastener 100 including the mount 160 and fastening block 170, the protrusions 161 formed in the mount 160 of the blind fastener 100 may indicate the orientation of the fastening block 170 down-hole. In instances where the aperture in the roofing material(s) (FIG. 16, 1602) is long enough to include a significant length of bolt 120 and corresponding length of sleeve 140 and insulating material 143, an orientation indicator 145 may be included on the sleeve 140 and/or insulating material 143. The orientation indicator 145 may align with the protrusions 161 and notches 144. Further, the orientation of the fastening block 170 aligns with the orientation indicator 145, the protrusions 161, and the notches 144 when the fastening block 170 is oriented in the second orientation as indicated by arrow 195 in FIGS. 1 and 3. In this manner, the down-hole orientation of the fastening block 170 may be known. This allows the user to know what direction to orient the blind fastener 100 in order to ensure that the fastening block 170 is oriented parallel to any features of the roofing material(s) (FIG. 16, 1602) including, for example, the corrugations formed in the roofing material(s) described above. In one example, the orientation indicator 145 may be printed on the exterior surfaces of the sleeve 140.

FIG. 16 is a plane view of the blind fastener 100 engaged with a material 1602, according to an example of the principles described herein. As mentioned above, the blind fastener 100 may have varying lengths to allow the blind fastener 100 to extend through varying thicknesses of the roofing material(s) 1602. In the examples described herein, the blind fastener 100 may be used without inclusion of the sleeve 140 and insulating material 143. In this example, the bolt may engage with the mount 160 without any intermediate elements. This allows for relatively thinner material(s) 1602 to be coupled together using the blind fastener 100.

In another example, the sleeve 140 and insulating material 143 may be cut or otherwise truncated to allow for the blind fastener 100 to extend through a thickness of material(s) 1602 that includes an intermediate thickness. In this example, the bolt 120 may also be cut or a length of the bolt 120 may be selected based on a matching length of the truncated sleeve 140 and insulating material 143.

In still another example, the bolt 120, the sleeve 140, and insulating material 143 may be manufactured to a number of common or industrially-specified lengths such that a user may select an appropriate, pre-fabricated length of each of the bolt 120, the sleeve 140, and insulating material 143 to match a thickness of the material(s) 1602. In still another example, several whole or partial lengths of the sleeve 140 and insulating material 143 may be used to match the thickness of the material(s). In this example, the bolt may be cut to or manufactured and selected at a matching length.

In one example, the blind fastener may be sold as kit. In this example, the mount 160, fastening block 170, and orientation spring 180 may be identical in each kit sold. Further, in this example, the length of the bolt 120, sleeve 140, and/or insulation 143 may be varied in different kits to allow a user to select an appropriate length that matches the user's specifications and to match a thickness of the material(s) through which the blind fastener 100 is to extend. In another example, the kit may include the mount 160, fastening block 170, and orientation spring 180 and not the bolt 120, sleeve 140, and/or insulation 143.

In still another example, the kit may include the mount 160, fastening block 170, and orientation spring 180 along with the bolt 120, the sleeve 140, and/or the insulation 143 where the bolt 120, the sleeve 140, and/or the insulation 143 include surplus lengths that may be used in any or most applications. In this example, the bolt 120, the sleeve 140, and/or the insulation 143 may be cut or otherwise truncated by the user based on measurements of a thickness of the material(s) through which the blind fastener 100 is to be extended.

INDUSTRIAL APPLICABILITY

The present disclosure describes a blind fastener that may include a bolt. The bolt includes a head, a shank coupled to the head, and a number of external threads formed on the shank. The blind fastener may also include a mount coupled to the bolt, and a fastening block coupled to the mount. The mount may include a body, at least one arm extending from the body, and at least one pivot mount formed on and extending from the arm about which the fastening block pivots.

Further, a system may include a bolt. The bolt may include a head, a shank coupled to the head, and a number of external threads formed on the shank. The system may also include a sleeve including a rigid cylinder positioned around the shank. The sleeve may include a notch defined in the rigid cylinder. The system may also include a mount coupled to the bolt, and a fastening block coupled to the mount. The mount may include a body, at least one arm extending from the body, and at least one pivot mount formed on and extending from the arm about which the fastening block pivots. The mount may include a protrusion formed on and extending from the mount. The protrusion has a shape that mates with the notch.

Still further, a blind fastener may include a bolt. The bolt may include a head, a shank coupled to the head, and a number of external threads formed on the shank. The blind fastener may also include a sleeve including a rigid cylinder positioned around the shank. The sleeve may include a notch defined in the rigid cylinder. A mount may be coupled to the bolt. The blind fastener may also include a fastening block coupled to the mount. The mount may include a body, at least one arm extending from the body, and at least one pivot mount formed on and extending from the arm about which the fastening block pivots. A spring may be coupled between the mount and the fastening block. The spring may be biased to pivot the fastening block about the pivot mount from a first orientation to a second orientation relative to a longitudinal axis of the blind fastener.

The blind fastener and associated systems, methods and kits are described herein. The blind fastener may be used to more efficiently couple two or more elements together in instances where the user cannot see or access an opposite side of the elements where a distal end of the blind fastener exits the elements. As a result, the systems and methods of the present disclosure may serve to allow for a more efficient and effective way to blindly fasten the elements together.

While aspects of the present disclosure have been particularly shown and described with reference to the examples above, it will be understood by those skilled in the art that various additional examples may be contemplated by the modification of the disclosed machines, systems, and methods without departing from the spirit and scope of what is disclosed. Such examples should be understood to fall within the scope of the present disclosure as determined based upon the claims and any equivalents thereof.

What is claimed is:

1. A blind fastener comprising:
   a bolt including:
      a head;
      a shank coupled to the head; and
      a number of external threads formed on the shank;
   a mount coupled to the bolt; and
   a fastening block coupled to the mount, the mount including:
      a body;
      at least one arm extending from the body;
      at least one pivot mount formed on and extending from the at least one arm about which the fastening block pivots;
   a first orifice defined in the fastening block, the first orifice including first internal threads; and
   a second orifice defined in the fastening block, the second orifice including second internal threads,
   wherein the first orifice includes a first axis that is perpendicular to a second axis of the second orifice.

2. The blind fastener of claim 1, further including a spring coupled to the mount and the fastening block, the spring biased to pivot the fastening block about the pivot mount from a first orientation to a second orientation relative to a longitudinal axis of the blind fastener.

3. The blind fastener of claim 1, further including:
   at least one flange formed on and extending from the mount,
   wherein the flange supports the fastening block when the fastening block is pivoted from a first orientation to a second orientation relative to a longitudinal axis of the blind fastener about the pivot mount.

4. The blind fastener of claim 1, further including:
   a sleeve including a rigid cylinder positioned around the shank, the sleeve including a notch defined in the rigid cylinder,
   wherein the mount includes a protrusion formed on and extending from the mount, the protrusion having a shape that mates with the notch.

5. The blind fastener of claim 4, wherein the protrusion is formed at a position along the mount that is aligned with a second orientation of the fastening block when the fastening block is pivoted about the pivot mount from a first orientation parallel with a longitudinal axis of the bolt to the second orientation perpendicular to the longitudinal axis of the bolt.

6. The blind fastener of claim 1, wherein:
   the first internal threads mate with the external threads formed on the shank, and
   the second internal threads mate with the external threads formed on the shank.

7. The blind fastener of claim 1, wherein:
   when the external threads formed on the shank are engaged with the first internal threads, the fastening block is oriented in a first orientation parallel with respect to a longitudinal axis of the blind fastener, and
   when the external threads formed on the shank are engaged with the second internal threads, the fastening block is oriented in a second orientation perpendicular with respect to the longitudinal axis of the blind fastener.

8. The blind fastener of claim 1, further including:
   a third orifice perpendicular to the first orifice and the second orifice,
   wherein the third orifice is dimensioned such that the pivot mount formed on and extending from the at least one arm mates with the third orifice.

9. A system comprising:
   a bolt including:
      a head;
      a shank coupled to the head; and
      a number of external threads formed on the shank;

a sleeve including a rigid cylinder positioned around the shank, the sleeve including a notch defined in the rigid cylinder;

a mount coupled to the bolt;

a fastening block coupled to the mount, the mount including:
- a body;
- at least one arm extending from the body; and
- at least one pivot mount formed on and extending from the at least one arm about which the fastening block pivots; and protrusion formed on and extending from the mount, the protrusion having a shape that mates with the notch, wherein the fastening block comprises:
- a first orifice defined in the fastening block, the first orifice including first internal threads; and
- a second orifice defined in the fastening block, the second orifice including second internal threads, and wherein the first orifice includes a first axis that is perpendicular to a second axis of the second orifice.

10. The system of claim 9, further including:

at least one flange formed on and extending from the mount, wherein the flange supports the fastening block when the fastening block is pivoted about the pivot mount from a first orientation parallel with a longitudinal axis of the bolt to a second orientation perpendicular to the longitudinal axis of the bolt.

11. The system of claim 9, wherein the first internal threads mate with the external threads formed on the shank;

the second internal threads mate with the external threads formed on the shank, and the fastening block further includes a third orifice perpendicular to the first orifice and the second orifice, wherein the third orifice is dimensioned such that the pivot mount formed on and extending from the at least one arm mates with the third orifice.

12. The system of claim 11, wherein:

when the external threads formed on the shank are engaged with the first internal threads, the fastening block is oriented in a first orientation parallel with respect to a longitudinal axis of the bolt, and when the external threads formed on the shank are engaged with the second internal threads, the fastening block is oriented in a second orientation perpendicular with respect to the longitudinal axis of the bolt.

13. The system of claim 9, further including insulation within the rigid cylinder of the sleeve.

14. The system of claim 9, wherein the rigid cylinder of the sleeve and the bolt have a length that is at least as long as a distance of material through which the rigid cylinder of the sleeve and the bolt are to be extended.

15. The system of claim 9, further comprising a spring coupled between the mount and the fastening block, the spring biased to pivot the fastening block about the pivot mount from a first orientation to a second orientation relative to a longitudinal axis of the bolt.

16. A blind fastener comprising:

a bolt including:
- a head;
- a shank coupled to the head; and
- a number of external threads formed on the shank;

a sleeve including a rigid cylinder positioned around the shank, the sleeve including a notch defined in the rigid cylinder;

a mount coupled to the bolt;

a fastening block coupled to the mount, the mount including:
- a body;
- at least one arm extending from the body; and
- at least one pivot mount formed on and extending from the at least one arm about which the fastening block pivots, wherein:
- the mount is made of a deformable material,
- the mount includes at least one incline formed on the at least one arm at angle with respect to the at least one arm, and
- the bolt extends through the mount and fastening block to interface with the incline to deform the at least one arm away from engagement with the pivot mount formed on and extending from the at least one arm.

17. The blind fastener of claim 16, further including:

at least one flange formed on and extending from the mount, wherein the flange supports the fastening block when the fastening block is pivoted about the pivot mount from a first orientation parallel with a longitudinal axis of the bolt to a second orientation perpendicular to the longitudinal axis of the bolt.

18. The blind fastener of claim 16, wherein deformation of the at least one arm disengages the fastening block from the pivot mount.

19. The blind fastener of claim 16, further comprising a spring coupled between the mount and the fastening block, the spring biased to pivot the fastening block about the pivot mount from a first orientation to a second orientation relative to a longitudinal axis of the bolt.

20. The blind fastener of claim 16, wherein the fastening block includes:

a first orifice defined in the fastening block, the first orifice including first internal threads, the first internal threads mating with the external threads formed on the shank;

a second orifice defined in the fastening block, wherein:
- the second orifice includes second internal threads,
- the second internal threads mate with the external threads formed on the shank, and
- the second orifice has a second axis perpendicular to a first axis of the first orifice; and a third orifice perpendicular to the first orifice and the second orifice, wherein the third orifice is dimensioned such that the pivot mount formed on and extending from the at least one arm mates with the third orifice, wherein:
- when the external threads formed on the shank are engaged with the first internal threads, the fastening block is oriented in a first orientation parallel with respect to a longitudinal axis of the blind fastener, and
- when the external threads formed on the shank are engaged with the second internal threads, the fastening block is oriented in a second orientation perpendicular with respect to the longitudinal axis of the blind fastener.

* * * * *